US006830695B1

(12) United States Patent
Brady et al.

(10) Patent No.: US 6,830,695 B1
(45) Date of Patent: Dec. 14, 2004

(54) IN SITU REMEDIATION PROCESS USING DIVALENT METAL CATIONS

(75) Inventors: Patrick V. Brady, Albuquerque, NM (US); Nadim R. Khandaker, Albuquerque, NM (US); James L. Krumhansl, Albuquerque, NM (US); David M. Teter, Edgewood, NM (US)

(73) Assignee: Sandia Corporation, Albuquerque, NM (US)

( * ) Notice: Subject to any disclaimer, the term of this patent is extended or adjusted under 35 U.S.C. 154(b) by 82 days.

(21) Appl. No.: 10/356,148

(22) Filed: Jan. 31, 2003

Related U.S. Application Data

(63) Continuation-in-part of application No. 10/127,887, filed on Apr. 23, 2002, which is a continuation-in-part of application No. 09/886,175, filed on Jun. 20, 2001.

(51) Int. Cl.[7] .................................................. C02F 1/28

(52) U.S. Cl. ........................ 210/679; 210/683; 210/684; 210/688; 210/747; 210/911; 210/913; 405/128.5; 405/129.25

(58) Field of Search ................................ 210/665, 667, 210/681, 688, 679, 716, 723, 728, 747, 683, 684, 911, 913; 405/128.75, 129.25, 128.5

(56) References Cited

U.S. PATENT DOCUMENTS

| | | | | |
|---|---|---|---|---|
| 4,176,057 A | | 11/1979 | Wheatley et al. | |
| 4,201,667 A | | 5/1980 | Liao | |
| 4,366,128 A | | 12/1982 | Weir et al. | |
| 4,392,979 A | | 7/1983 | Lee et al. | |
| 4,622,149 A | * | 11/1986 | Devuyst et al. | 210/717 |
| 4,738,834 A | | 4/1988 | Moore et al. | |
| 4,935,146 A | | 6/1990 | O'Neill et al. | |
| 4,954,263 A | | 9/1990 | Woodhouse | |
| 5,137,640 A | * | 8/1992 | Poncha | 210/724 |
| 5,228,903 A | | 7/1993 | O'Keefe | |
| 5,348,662 A | * | 9/1994 | Yen et al. | 210/717 |
| 5,360,547 A | * | 11/1994 | Cockett et al. | 210/690 |
| 5,378,366 A | | 1/1995 | Yen | |
| 5,505,857 A | | 4/1996 | Misra et al. | |
| 5,556,545 A | | 9/1996 | Volchek et al. | |
| 5,603,838 A | | 2/1997 | Misra et al. | |
| 5,859,306 A | * | 1/1999 | Stanforth | 588/236 |
| 5,911,882 A | | 6/1999 | Benjamin et al. | |
| 5,916,123 A | | 6/1999 | Pal et al. | |
| 5,985,790 A | | 11/1999 | Moskovitz et al. | |
| 6,030,537 A | | 2/2000 | Shaniuk et al. | |
| 6,042,731 A | | 3/2000 | Bonnin | |
| 6,217,779 B1 | * | 4/2001 | Orth et al. | 210/757 |
| 6,254,312 B1 | * | 7/2001 | Chowdhury et al. | 405/128.5 |
| 6,264,845 B1 | | 7/2001 | Higby et al. | |

OTHER PUBLICATIONS

Balsley, S.D., et al., "Anion Scavengers for Low–Level Radioactive Waste Repository Backfills," *Journal of Soil Contamination,* vol. 7, No. 2, pp 125–141 (1998).

Bellack, E., et al., "Arsenic Removal From Potable Water," *Journal AWWA,* pp 454–458, Jul. 1971).

Benjamin, M.M., et al., "Sorption and Filtration of Metals Using Iron–Oxide–Coated Sand," *Water Res.,* vol. 30,, No. 11, pp 2609–2620 (1996).

Chakravarty, S., et al., "Removal of Arsenic from Groundwater Using Low Cost Ferruginous Manganese Ore," *Water Research,* vol. 36, pp 625–632 (2002).

Chiu, V.Q., et al., "Arsenic Adsorption and Oxidation at Manganite Surfaces. 1. Method for Simultaneous Determination of Adsorbed and Dissolved Arsenic Species," *Environ. Sci. Technol.,* vol. 34, pp 2029–2034 (2000).

Driehaus, W., et al., "Granular Ferric Hydroxide—a New Adsorbent for the Removal of Arsenic from Natural Water," *J. Water SRT–Aqua,* vol. 47, pp 30–35.

Fryxell, G.E, et al., "Design and Synthesis of Selective Mesoporour Anion Traps," *Chem Mater.,* vol. 11, o. 8, pp 2148–2154 (1999).

Gregor, J., "Arsenic Removal During Conventional Aluminum–Based Drinking–Water Treatment," *Wat. Res.,* vol. 35, No. 7, pp 1659–1664 (2001).

Gupta, S.K., et al., "Arsenic Removal by Adsorption," *J. WPCF,* pp 493,506 (Mar. 1978).

Harper, T.R., et al., "Removal of Arsenic from Wastewater Using Chemical Precidipation Methods," *Water Environ. Res.,,* vol. 64, No. 3 pp 200–202 (May/Jun. 1993).

Hering, J.G., et al., "Arsenic Removal From Drinking Water During Coagulation," *J. Environ Eng.,* pp 800–807 (Aug. 1997).

Hering, J.G., et al., "Arsenic Removal By Ferric Chloride," *J. AWWA,* pp 155–167 (Apr. 1996).

(List continued on next page.)

*Primary Examiner*—Peter A. Hruskoci
(74) *Attorney, Agent, or Firm*—Jeffrey D. Myers

(57) ABSTRACT

An in situ process for treating ambient solid materials (e.g., soils, aquifer solids, sludges) by adding one or more divalent metal cations to the ambient solid material. The added divalent metal cations, such as $Cu^{2+}$ or $Zn^{2+}$, combine with metal oxide/hydroxides (e.g., ferric oxide/hydroxide or aluminum oxide/hydroxide) already present in the ambient solid material to form an effective sorbent material having a large number of positively-charged surface complexes that binds and immobilizes anionic contaminant species (e.g., arsenic or chromate). Divalent metal cations can be added, for example, by injecting an aqueous solution of $CuSO_4$ into an aquifer contaminated with arsenic or chromate. Also, sludges can be stabilized against leaching of anionic contaminants through the addition of divalent metal cations. Also, an inexpensive sorbent material can be easily formed by mixing divalent metal cations with soil that has been removed from the ground.

4 Claims, No Drawings

OTHER PUBLICATIONS

Kartinen Jr., E.O., et al., "An Overview of Arsenic Removal Processes," *Desalination,* vol. 103, pp 79–88 (1995).

Lee, J.Y., et al., "Arsenic Removal by Sorption Processes from Waste Waters," *Canadian Mining and Metallurgical (CIM) Bulletin,* pp 33–37 (Nov. 1972).

LeFevre, G., et al., "Uptake of Iodide by a Mixture of Metallic Copper and Cupric Compounds", *Environ. Sci. Technol.,* vol. 33, pp 1732–1737 (1999).

LeFevre, G., et al., "Sorption of Iodide on Cuprite ($Cu_2O$)", *Langmuir,* vol. 16, pp 4519–4527 (2000).

McNeill, L.S., et al., "Predicting As Removal During Metal Hydroxide Precipitation," *J. AWWA,* vol. 89, No. 1, pp 75–86 (Jan. 1997).

Matis, K.A., et al., "Flotation Removal of As(V) Onto Goethite," *Environmenal Pollution,* vol. 97, No. 3, pp 239–245 (1997).

Meng, X., et al., "Treatment of Arsenic in Bangaladesh Well Water Using a Household Co–Precipitation and Filtration System," *Wat. Res.,* vol. 35, No. 12, pp 2805–2810 (2001).

Pierce, M.L., et al., "Adsorption of Arsenite and Arsenate on Amorphous Iron Hydroxide," *Water. Res.,* vol. 16, pp 1247–1253 (1982).

Singh, D.B., et al., "Adsorption Technique for the Treatment of As (v)–rich Effluents," *Colloids and Surfaces A:Physicochemical and Engineering Aspects,* vol. 111, pp 49–56 (1996).

Viraraghavan, T., et al., "Arsenic in Drinking Water—Problems and Solutions," *Wat. Sci. Tech.,* vol. 40, No. 2, pp 69–76 (1999).

Wu, C–H, et al., "Competitive Adsorption of Molybdate, Chromate, Sulfate, Selenate, and Selenite on $\gamma$–$Al_2O_3$", *Colloids and Surfaces, A:Physicochemical and Engineering Aspects,* vol. 166, pp 251–259 (2000).

Xu, H., et al., "Influence of PH and Organic Substance on the Adsorption of As(V) on Geologic Materials," *Water, air and Soil Pollution,* vol. 40, pp 293–305 (1988).

Driehaus, W., et al., "Granular Ferric Hudroxide—a New Adsorbent for the Removal of Arsenic from Natural Water," *J. Water SRT–Aqua,* vol. 47, pp 3035 (1998).

* cited by examiner

IN SITU REMEDIATION PROCESS USING DIVALENT METAL CATIONS

CROSS REFERENCE TO RELATED APPLICATIONS

This application is a continuation-in-part of U.S. Non-Provisional Patent Application Ser. No. 09/886,175, filed on Jun. 20, 2001, and Ser. No. 10/127,887, filed on Apr. 23, 2002, and the specifications thereof are incorporated herein by reference.

GOVERNMENT RIGHTS

The Government has tights to this invention pursuant to Contract No. DE-AC04-94AL85000 awarded by the U.S. Department of Energy.

BACKGROUND OF THE INVENTION

1. Field of the Invention (Technical Field)

The present invention relates to in situ decontamination of soil, groundwater, and sludges containing ionic contaminants, especially groundwater containing anionic contaminants. In particular, the invention relates to the in situ immobilization of arsenic and chromate contaminants from water by injecting divalent metal cations into an aquifer.

2. Background of the Invention

Note that the following discussion refers to a number of publications by author(s) and year of publication, and that due to recent publication dates certain publications are not to be considered as prior art vis-à-vis the present invention. Discussion of such publications herein is given for more complete background and is not to be construed as an admission that such publications are prior art for patentability determination purposes.

For purposes of this disclosure, unless otherwise specified, the term "metal oxides" is intended to include both metal oxides and metal hydroxides. Similarly, for purposes of this disclosure, "arsenic contaminants" includes both arsenates and arsenites.

Arsenic contaminants are examples of anionic contaminants that may be present in groundwater or industrial wastewater as a result of natural as well as human mediated causes. The long-term availability of safe and affordable drinking water depends, in part, on availability of effective and economical treatment means for removing arsenic contaminants (as well as other anionic contaminants including chromate) from water. Successful treatment strategies, in turn, depend on not significantly altering the waters other characteristics (for example but not limited to, pH) in ways that would make it non-potable. Present treatment methods rely on pumping groundwater to the surface where it is processed above ground in a treatment facility. It would be cheaper if the contaminated groundwater could be treated in situ by injecting inexpensive treatment media directly into the ground, for example, into an aquifer.

Arsenic and other anionic contaminants likewise pose risks when present in fluids other than drinking water sources. For example, industrial wastewater streams often contain such contaminants, and their sources, typically sludges, require remediation and stabilization even when they are not considered to be directly associated with potable drinking water sources. Present art practices for sludge stabilization require expensive treatments, for example, lining of landfills.

Various sorbent materials for removing arsenic contaminants and other anionic contaminants from water have been used and developed previously. For example, certain metal oxide/hydroxide compounds, such as $Al_2O_3$ and $Fe_2O_3$, have been demonstrated to sorb anionic contaminants, including arsenic contaminants, from water. A drawback associated with use of such trivalent compounds alone is that, because they typically exhibit a point of zero charge from pH 7 to 9, the water to be treated may need to be acidified in order for these compounds to sorb anions to a significant degree. Thus, after treatment, in order to restore the potability of the treated water, further amendments must be added to bring the pH back up to an acceptable drinkable range. Similarly, tetravalent metal oxides such as $SiO_2$ could be effective anion sorbents, however, their point of zero charge is typically around a pH of approximately 2, so extremely acidic conditions would be needed for tetravalent metal oxides to sorb anions. Additionally, these substances are considered likely to fall outside of the range of useful sorbents because of other chemical issues associated with operating at such low pH.

The divalent oxide MgO, likewise, has been shown chemically to sorb anions including arsenic in water. Although use of MgO does not necessitate driving the pH of water outside of the potable range (divalent metal oxides tend to exhibit a point of zero charge that is pH 10 or higher), the effectiveness of MgO as a sorbent for water decontamination, however, can be limited. This is due to its tendency to form carbonates in the presence of carbon in the water from natural (e.g., biological and atmospheric) sources. When this occurs, the carbonate species formed at the surface lack any significant electrostatic attraction for negatively-charged ions. Thus, the sorbency of the MgO can be short-lived absent taking steps to reverse the carbonate reaction and to restore the sorbent.

The sorbency methods just discussed rely on the electrostatic attraction between positively charged surface species and negatively charged contaminants. An altogether different mechanism that has been exploited to decontaminate water containing ionic contaminant species is ion exchange. Examples of ion exchange materials suitable for water decontamination include hydrotalcites (which exchange anions) and zeolites (which exchange cations). Although ion exchange materials have been shown to be effective without causing the types of problems associated with MgO (carbonate issues), ion exchange materials can be very expensive. Zeolites that allow for separations based on size are also used in some decontamination applications, but they do not sorb anionic species such as chromate and arsenic contaminants in water.

The need remains for improved decontamination approaches that are inexpensive, yet effective in removing anionic contaminants, including chromate, arsenates and arsenites. Further, there is a need for an approach that can be used in large-scale remediation in an inexpensive manner.

SUMMARY OF THE INVENTION

The present invention relates to an in situ process for treating ambient solid materials (e.g., soils, aquifer solids, sludges) by adding one or more divalent metal cations to the ambient solid material. The added divalent metal cations, such as $Cu^{2+}$ or $Zn^{2+}$, combine with metal oxide/hydroxides (e.g., ferric oxide/hydroxide or aluminum oxide/hydroxide) already present in the ambient solid material to form an effective sorbent material having a large number of positively-charged surface complexes that can bind and immobilize anionic contaminant species (e.g., arsenic or chromate) dissolved in any surrounding water. Divalent metal cations can be added, for example, by injecting an aqueous solution of $CuSO_4$ into an aquifer contaminated with arsenic or chromate. Also, sludges can be stabilized against leaching of anionic contaminants through the addition of divalent metal cations. Also, an inexpensive sorbent material can be easily formed by mixing divalent metal cations with soil that has been removed from the ground.

DESCRIPTION OF THE PREFERRED EMBODIMENTS (BEST MODES FOR CARRYING OUT THE INVENTION)

The present invention relates to an in situ process for treating ambient solid materials (e.g., soils, aquifer solids, sludges) by adding one or more divalent metal cations to the ambient solid material. The added divalent metal cations, such as $Cu^{2+}$ or $Zn^{2+}$, combine with metal oxide/hydroxides (e.g., ferric oxide/hydroxide or aluminum oxide/hydroxide) already present in the ambient solid material to form an effective sorbent material having a large number of positively-charged surface complexes that can bind and immobilize anionic contaminant species (e.g., arsenic or chromate) dissolved in any surrounding water. Divalent metal cations can be added, for example, by injecting an aqueous solution of $CuSO_4$ into an aquifer contaminated with arsenic or chromate. Also, sludges can be stabilized against leaching of anionic contaminants through the addition of divalent metal cations. Also, an inexpensive sorbent material can be easily formed by mixing divalent metal cations with soil that has been removed from the ground.

Certain embodiments of this invention utilize the principle that oxides and hydroxides of divalent cations possess intrinsically high anion sorption capacities relative to most soil solids. The inventors have found that the sorptive capacities of ambient (i.e., native, preexisting) materials, such as but not limited to soils (including sand, gravel, aggregate, clay, organic matter, and mixtures thereof), solid materials that make up the permeable aquifer, and sludges, may be raised by addition of divalent metal cations. Ambient materials commonly contain metal oxides and metal hydroxides, particularly oxides and hydroxides of iron and aluminum. For example, although ferric oxide is a minor bulk component of most soils, it tends to dominate the surfaces of soils and aquifers. Consequently, fluids in contact with many aquifer solids (i.e., the solid materials that make up the permeable structure of the aquifer) also contact a large surface area of ferric oxide or hydroxide. Therefore, divalent metal cations added to soil and/or aquifer solids will be exposed to a large surface area of these naturally-occurring metal oxides and hydroxides (e.g., ferric oxide). The added divalent metal cations that bind to the surfaces of the metal oxides (hydroxides) form surface complexes characterized by a substantial increase in the surface area-normalized number of anion-sorbing positively-charged surface groups. Consequently, negatively-charged contaminant anions (e.g., arsenic anions, chromate anions) are effectively removed (i.e., sequestered, immobilized) from the ambient water when they become strongly bound to these positively-charged surface groups. Hence, one mechanism of anion uptake is believed to be sorption of anions onto divalent or trivalent metal oxides (or hydroxides), or mixed divalent-trivalent metal oxides (or hydroxides), which have been formed in situ at the surfaces of solid ambient materials, through the combination of divalent metal cations that have been added to the pre-existing, naturally-occurring metal oxides and hydroxides.

Certain embodiments of the sorbent materials employed in the present invention to adsorb negatively-charged contaminant species in water do so at pH within the drinkable range for water. Moreover, certain of the materials disclosed herein do not exhibit the tendency to form carbonates to a degree sufficient to render them inactive for purposes of anion sorption. According to the invention, sorbent materials effective for sequestering arsenic-containing contaminants from water are selected, or can be engineered, to exhibit anion sorption in the pH range of potable water.

The in situ remediation process of certain embodiments of the invention reduces the dissolved concentration of anionic contaminents of water surrounding the ambient solid material, by immobilizing or sequestering the anions onto pre-existing metal oxide/hydroxide compounds that have been modified by the addition of divalent metal cations. In this sense, the anionic contaminents are "removed" from water surrounding the ambient solids by being locally bound (i.e., immobilized or sequestered); however, they are not physically removed.

At any given pH, the extent of sorption is measured in terms of $K_d$ the sorption coefficient, i.e., the ratio of contaminant sorbed (moles/g) to contaminant in solution (moles/ml):

$$K_d=((C_o-C_\theta)/C_\theta)(V_{sol}/M_{ads})$$

where $C_o$ is initial concentration or contaminant in solution, $C_\theta$ is final concentration of contaminant in solution, $V_{sol}$ is total volume of solution, and $M_{ads}$ is total mass of adsorbent.

Materials with $K_d$ values greater than 10 ml/g are generally considered to be strong sorbents. Therefore, in an embodiment of the present invention, addition of divalent metal cations may produce a $K_d$ coefficient of approximately 10 ml/g or greater.

Divalent metal cations used in certain embodiments of the present invention may be chosen from the following set: $Co^{2+}$ $Cu^{2+}$, $Fe^{2+}$, $Mg^{2+}$, $Mn^{2+}$, $Ni^{2+}$, $Zn^{2+}$, $Cd^{2+}$, $Pb^{2+}$, $Hg^{2+}$, $Ca^{2+}$, $Ba^{2+}$, $Be^{2+}$, or any combination thereof. Sources of the divalent metal cations used in certain embodiments of the present invention may be chosen from the following set of divalent metal cation salts: copper sulfate ($CuSO_4$), hydrous copper sulfate, copper chloride, copper nitrate, copper acetate, zinc sulfate ($ZnSO_4$), hydrous zinc sulfate, zinc chloride, zinc nitrate, anhydrous zinc nitrate, or any combination thereof. Divalent metal cations may be added in situ to ambient materials in solid or liquid form, or as a solid particles suspended in a gas or liquid. Solid particles, powder, crystals may be, for example, dropped or sprayed onto the surface, injected inside, stirred, rototilled, or mixed into the ambient material (e.g., injected underground by a jet injector nozzle using pressurized air as the carrier medium). Alternatively, solid particles of divalent metal cations may be suspended in or dissolved into a liquid carrier media, such as water or saltwater, and poured, sprayed, stirred, mixed into, or injected into the ambient material (e.g., injected underground by a jet injector nozzle using high pressure water as the carrier medium).

In another embodiment of the present invention, an underground or near-surface reactive permeable barrier (PRB) wall or zone may be created where the reactive properties of the emplaced wall or zone has been enhanced by the addition of divalent metal cations (i.e., by pouring into a trench, or by jet injection through a series of closely-spaced drill holes). Treatment of the ambient materials (e.g., soil, aquifer solids) in this way (i.e., by dispersing divalent metal cations underground in the shape of a PRB wall or zone), allows any contaminated groundwater that may subsequently pass through the PRB to be remediated by sorbing the anionic contaminants onto to ambient (naturally-occurring) iron or aluminum oxides/hydroxides that were previously enhanced by the addition of divalent metal cations. In other words, a region of the ground has been pre-treated by addition of the divalent metal cations, prior to contaminant exposure.

In another embodiment of the present invention, an aqueous solution of $CuSO_4$ is injected the ground at multiple locations arranged in a suitable pattern in the shape of a permeable reactive barrier or zone. This method may include drilling underneath a contaminated site (or suspected contaminated site) by using angled drilling methods (i.e., non-vertical), and then injecting the divalent metal cations at one or more depths inside the angled well bore.

In another embodiment of the present invention, an aqueous solution of $CuSO_4$ is injected directly into a contaminated underground site at one or more injection points.

In one embodiment, the amount of $CuSO_4$ added can be that amount which is sufficient to reduce the dissolved arsenic or chromate concentration by a factor of at least two.

In another embodiment of the present invention, divalent metal cations may be added by injecting, for example, an aqueous solution comprising a divalent metal cation salt, directly into an arsenic (or chromate) contaminated body of water. or aquifer, through one or more injection sites, so that in situ immobilization (i.e., removal) of the mobile anionic contaminants is rapidly accomplished.

In another embodiment of the present invention, an aqueous solution of $CuSO_4$ is injected directly into a contaminated underground site.

In another embodiment of the present invention, divalent metal cations may be added to existing sludge (located, e.g., aboveground in tanks or open basins, in trenches, or underground in tanks or shallow burial sites, pits), which may be in dried, partially wet, or mostly-liquid form. Depending on the sludge's form (dry, wet, etc.), the divalent metal cations may be added, for example, by mixing or rototilling crystals of copper sulfate (a divalent metal cation salt) into a dried sludge, or by stirring/mixing of an aqueous solution comprising $Cu^{2+}$ cations into a mostly-liquid sludge. Sorption of anionic contaminants onto the divalent metal cation enhanced metal oxides/hydroxides (ferric oxide, alumina, etc.) has been found to reduce the amount of anionic contaminants that can leach from the treated sludge due to water infiltration. In this sense the anionic contaminants are immobilized or sequestered in situ (i.e., inside the sludge).

In another embodiment of the present invention, an aqueous solution of CuSO4 is mixed with the sludge.

In another embodiment of the present invention, an inexpensive sorbent medium can be produced by adding divalent metal cations to soil containing suitable metal oxides/hydroxides (e.g., ferric oxide or alumina). The divalent metal cations are added above-ground to an amount of soil that has been removed from the ground (i.e., dug up). Any of the techniques described above for adding the divalent metal cations to soil may be used. The resulting amended soil contains the anion-sorbing material that has been formed "in situ" (in this case, "in situ" means inside of the soil that has been dug-up from the ground) by combining divalent metal cations with the metal oxides and hydroxides already existing in the dug-up soil. The resulting amended soil (with enhanced anion-sorption capacity) can be used as an inexpensive reactive filter media for treating drinking water at the point of use (e.g., in a small village, by pouring contaminated water through a container holding the amended soil).

In another embodiment of the present invention, an inexpensive sorbent medium can be produced by adding $CuSO_4$ (e.g., crystals, or an aqueous solution) to soil containing iron or aluminum, or both iron and aluminum, which has been dug-up from the ground.

Industrial Applicability:

The invention is further illustrated by the following non-limiting examples.

EXAMPLE 1

10 ml of distilled, deionized (arsenic-free) water was spiked with 0.0, 0.1, 0.25, 0.5 or 1.0 mg/L of $CuSO_4$ and was then added to 0.5 g of soil (obtained from Laxmipur Bangladesh) and was further allowed to equilibrate. Solution samples were taken from the reaction vessels and were again equilibrated for 24 hours, 18 days, and 23 days. The solution samples were then filtered and analyzed for arsenic content. Table 1 below indicates dissolved arsenic levels from these samples.

TABLE 1

Arsenic Effluent Levels

| $CuSO_4$ Initial Concentration (mg/L) | Equilibration Time (days) | Arsenic Final Effluent Level (ppb) |
|---|---|---|
| 0.0 | 1 | 2.1 |
| | 18 | 2.93 |
| | 23 | 2.03 |
| 0.1 | 1 | 1.3 |
| | 18 | 2.15 |
| | 23 | 1.56 |
| 0.25 | 1 | 1.7 |
| | 18 | 2.43 |
| | 23 | 1.46 |
| 0.5 | 1 | 1.7 |
| | 18 | 1.82 |
| | 23 | 1.88 |
| 1.0 | 1 | 1.3 |
| | 18 | 1.66 |
| | 23 | 1.76 |

Resulting arsenic levels were lower at higher $CuSO_4$ spiking levels, indicating that addition of the copper salt inhibited leaching of arsenic from the soil.

EXAMPLE 2

Separate 20 g samples of soil (Tijeras Arroyo, southeast Albuquerque, N. Mex.) were equilibrated with 40 ml of solution, containing an approximately 50 ppb concentration of dissolved arsenic. Samples of the solution were spiked, respectively, with 0.0, 0.1, 0.25, 0.5, 0.75, 1.0, 1.5, and 2.0 mg/l $CuSO_4$. After 48 hours, the spiked solutions were extracted, filtered, and analyzed for dissolved arsenic. Table 2 below demonstrates that $CuSO_4$ addition caused a clear decrease in the amount of dissolved arsenic due to the increased sorption of arsenic.

TABLE 2

Initial Concentration of $CuSO_4$ v. Final Arsenic Concentration

| $CuSO_4$ Initial Concentration (mg/l) | Arsenic Final Concentration Level (ppb) |
|---|---|
| 0.0 | 23.1 |
| 0.1 | 21.38 |
| 0.25 | 22.95 |
| 0.5 | 27.9 |
| 0.75 | 18.25 |
| 1.0 | 17.1 |
| 1.5 | 11.5 |
| 2.0 | 13.2 |

EXAMPLE 3

Two soil samples, a gossan and the Tijeras soil sample as noted in Example 2, were separated into two sub-samples.

(Gossans are iron oxide-rich soils caused by weathering of ore bodies. The Tijeras sample was also assumed to contain iron oxides, given its reddish brown color.) One sub-sample of each, the gossan and the Tijeras soil, was soaked in 0.1 M $CuSO_4$ and was then rinsed to stop reaction. One sub-sample of each soil was left untreated. Each of the four samples was then equilibrated with an aliquot of City of Albuquerque, N. Mex. tap water (pH=7.7, 33 ppm chloride, 40 ppm $SiO_2$, 26 ppm sulfate, 1 ppm fluoride, 106 ppm bicarbonate ($CaCO_3$)), and was then spiked to 20 ppm dissolved As. After equilibration, the supernatant of each sample was extracted, filtered, and analyzed to determine As content. Initial and final dissolved arsenic levels were used to calculate sorption coefficients ($K_d$) for each material according the formula set forth in the specification. Table 3 demonstrates that treatment of soils containing iron oxides with copper sulfate caused a substantial increase in its ability to sorb arsenic.

TABLE 3: Increased Sorbing of Arsenic by Doping with Copper Sulfate

| Soil Sample Source | | Sorption Coefficient, $K_d$ (ml/g) |
|---|---|---|
| Tijeras | Untreated | 1 |
| Tijeras | Doped with $CuSO_4$ | ≧39 |
| Gossan | Untreated | 1 |
| Gossan | Doped with $CuSO_4$ | 10 |

EXAMPLE 4

Samples of aluminum oxide or ferric oxide doped with divalent metal cations were prepared by combining constituent salts and adjusting the resulting solution to near neutral pH. Batch sorption experiments were performed to test the ability of the various solids to sorb arsenate and chromate. Solutions containing 100 ppb, 1 ppm, and 100 ppm of arsenate (or chromate) in a City of Albuquerque tap water (as described in Example 3) matrix were synthesized. 0.25 g each of unheated and heat-treated mixed-oxide sorbents was mixed with 20 ml of arsenic containing solutions for 5 minutes. The solutions were then filtered (0.2 $\mu$m filter), and the resulting arsenic concentration was analyzed using inductively coupled plasma mass spectroscopy (ICP-MS). Table 4 indicates arsenic concentration and the $K_d$ of each sample, showing improved final As concentration levels for each copper and zinc sulfate salt used as a dopant.

TABLE 4

Arsenate & Chromate Sorption by Copper and Zinc Doped Alumina & Ferric Hydroxides

| Material | | | As Concentration, Initial (ppb) | As Concentration, Final (ppb) | $K_d$ (ml/g) |
|---|---|---|---|---|---|
| ARSENATE SORPTION | | | | | |
| $CuAl_2O_4$ | Spinel-like | 400° | 132 | >0.2 | 52720 |
| $ZnAl_2O_4$ | Spinel-like | 400° | 132 | >0.2 | 52720 |
| $CuFe_2O_4$ | Spinel-like | Unheated | 132 | 0.4 | 26320 |
| $CuFe_2O_4$ | Spinel | 400° | 132 | 13 | 732 |
| $ZnFe_2O_4$ | Spinel-like | Unheated | 132 | 0.9 | 203 |
| $ZnFe_2O_4$ | Spinel | 400° | 132 | 6.7 | 27 |

TABLE 4-continued

Arsenate & Chromate Sorption by Copper and Zinc Doped Alumina & Ferric Hydroxides

| Material | | | As Concentration, Initial (ppb) | As Concentration, Final (ppb) | $K_d$ (ml/g) |
|---|---|---|---|---|---|
| CHROMATE SORPTION | | | | | |
| $ZnAl_2O_4$ | Spinel-like | 400° | 1010 | 3 | 6713 |
| $CuFe_2O_4$ | Spinel-like | Unheated | 1010 | 40 | 485 |

Note that arsenate and chromate $K_4$'s measured on non-doped ferric hydroxide and alumina are generally lower than the values of Table 4, indicating that adding $Zn^{2+}$ or $Cu^{2+}$ to oxides or hydroxides of aluminum or ferric iron causes an increase in the anion sorptivity of the solid relative to the non-doped solid.

EXAMPLE 5

Two PVC experimental columns were packed with the Tijeras soil described in Example 2, and were subjected to a constant flow of 50 ppb of As-containing City of Albuquerque, N. Mex. tap water as set forth in Example 3. Effluent As levels were measured over regular intervals. $CuSO_4$ was injected through several ports into one column. The remaining column was not treated with $CuSO_4$. The $CuSO_4$ column demonstrated a 220% decrease in effluent As levels relative to the normalized As effluent levels measured in the untreated column.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference.

What is claimed is:

1. A water decontamination process comprising the steps of:

forming a sorbent material by mixing an ambient solid material selected from the group consisting of soils and sludges, with one or more metal-containing compounds selected from the group consisting of zinc compounds and copper compounds, wherein the ambient solid material comprises at least on metal-containing compound selected from the group consisting of ferric oxide, ferric hydroxide, aluminum oxide, and aluminum hydroxide; and contacting with the sorbent material water containing anionic contaminants, wherein the anionic contaminants are selected from the group consisting of arsenic-containing compounds and chromate containing compounds.

2. The process of claim 1 wherein in the forming step, the ambient solid material is an aquifer soil.

3. The process of claim 1 wherein in the forming step one or more of the metal-containing compounds are salts.

4. A process for treating an arsenic-contaminated aquifer, comprising injecting a sufficient amount of aqueous solution of copper sulfate into the aquifer to reduce the dissolved arsenic concentration by at least a factor of 2 substantially without adjusting pH of the arsenic-contaminated aquifer.

* * * * *